Jan. 22, 1957 S. LUBKIN 2,778,977
COMPONENT MOUNTING ASSEMBLAGE
Filed May 22, 1952 3 Sheets-Sheet 1
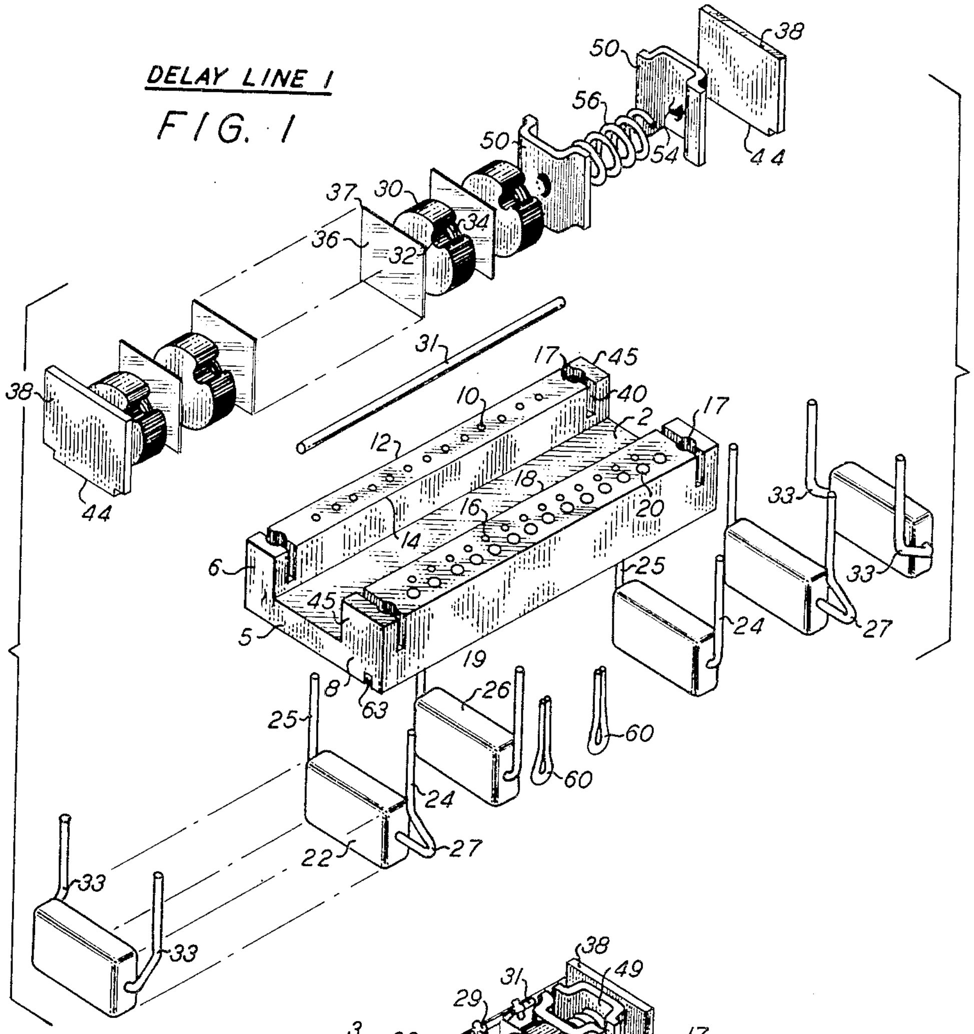
DELAY LINE I FIG. 1
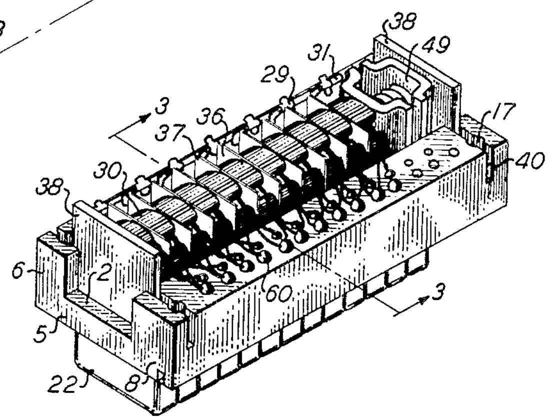
DELAY LINE I
FIG. 2
INVENTOR.
SAMUEL LUBKIN
BY S.C. Yuter
ATTORNEY Jan. 22, 1957 S. LUBKIN 2,778,977

COMPONENT MOUNTING ASSEMBLAGE

Filed May 22, 1952 3 Sheets-Sheet 2

DELAY LINE 1'

INVENTOR.
SAMUEL LUBKIN
BY
S.C. Yuter
ATTORNEY

Jan. 22, 1957

S. LUBKIN 2,778,977

COMPONENT MOUNTING ASSEMBLAGE

Filed May 22, 1952

3 Sheets-Sheet 3

INDUCTOR 30

DELAY LINE 1''

INVENTOR.
SAMUEL LUBKIN

BY S.C. Yuter

ATTORNEY

United States Patent Office 2,778,977
Patented Jan. 22, 1957

2,778,977

COMPONENT MOUNTING ASSEMBLAGE

Samuel Lubkin, Brooklyn, N. Y., assignor, by mesne assignments, to Underwood Corporation, New York, N. Y., a corporation of Delaware Application May 22, 1952, Serial No. 289,235

17 Claims. (Cl. 317—101)

This invention relates to electrical delay lines and more particularly to a component mounting assemblage for delay lines of the lumped parameter type.

A lumped parameter delay line, in one form, consists of a plurality of inductors in series, with a capacitor shunting each inductor to a common connection. In order to achieve maximum performance of the delay line, it is necessary that the inductors be arranged in such manner that a certain amount of mutual inductance will exist between the inductors.

One known way of obtaining the necessary mutual inductance is to place each of the inductors on a separate magnetic core and mount the cores adjacent to each other. In my co-pending application, Serial No. 289,722 filed May 24, 1952 there is described and claimed an inductor assemblage of this type utilizing individual spaced cylindrical cores each having a circularly grooved portion at one end to receive a coil winding.

To complete the delay line, capacitors are usually mounted on support terminals and are connected between the junctions of the inductors and a common connecting bus. The difficulty with this type of construction is that it necessitates a separate mounting member for the capacitors. Additionally, if the inductors are wound with very fine wire, the soldering of any of the leads to tie points necessitates the prior winding of the wire around the tie points. This type of construction requires a relatively large amount of skilled labor at concomitant high cost.

An object of the present invention, therefore, is to provide an improved component mounting assemblage for lumped parameter delay lines which significantly reduces the cost of manufacture of delay lines of this type.

Another object of the present invention is to provide a simplified method of construction of lumped parameter delay lines which facilitates the quick mounting and wiring of the individual components.

A further object is to provide a simple and inexpensive tie point means for attaching very fine wire leads of a delay line to a common connection.

The invention is hereinafter described, by way of example only, in connection with a delay line of the lumped parameter type particularly adaptable to use in high speed computer devices. The construction of a suitable delay line is described and claimed in my co-pending application Serial No. 289,236, filed May 22, 1952.

In accordance with the present invention a component mounting assemblage is provided comprising an elongated U-shaped mounting member made from insulating material and having a plurality of holes extending vertically through each leg. A plurality of capacitors are arranged beneath the base of the member with each lead of the individual capacitors extending through a corresponding hole in each of the legs of the member, the bending of the leads at the exits of the holes providing the required support for each capacitor. One lead of each capacitor is connected directly to a tap on an associated inductor and the remaining lead is connected to a common connecting bus. Individual inductors are mounted adjacent to each other between the legs of the U-shaped member.

A feature of the invention is the use of short pieces of wire bent into a hairpin shape and inserted in other holes in one leg of the mounting member to provide tie points for other leads of the inductors, each tie point being supported by the bending of the ends of the wire at the exit of the hole.

Other objects, features and advantages will appear in the subsequent detailed description which is accompanied by a drawing wherein:

Fig. 1 is an exploded view of a delay line of the lumped parameter type embodying the invention.

Fig. 2 is an unexploded perspective view of the delay line of Fig. 1.

Figure 3:
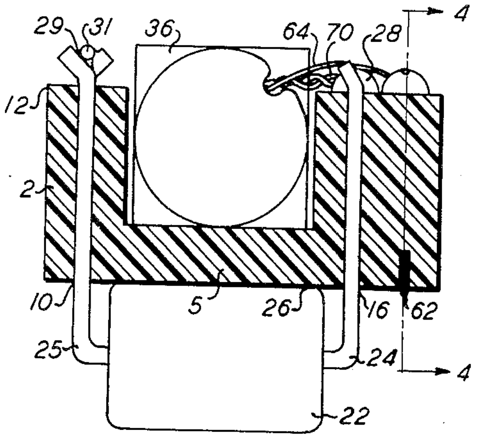
Fig. 3 is a sectional view of Fig. 2 along the lines 3—3 showing a feature of the invention.

Referring more particularly to the delay line 1 shown in Figs. 1 and 2, the elongated U-shaped mounting member 2 is constructed from a material having good electrical insulating and mechanical properties; for example, a phenolic material having a fabric base to provide mechanical strength.

The mounting member 2 comprises a base 5 and two legs 6 and 8. This shape may easily be achieved by milling out a rectangular cross section or channel from a solid block of material. The set of holes 10 is drilled vertically through leg 6 and lies on a line parallel to the edges 12 and 14 of leg 6, and midway between said edges.

A second set of holes 16 is drilled vertically through leg 8 and lies on a line parallel to the edges 18 and 19 of leg 8. A third set of holes 20 also extends vertically through leg 8 on a line parallel to the edges 18 and 19. The holes 20 are arranged at a greater distance from edge 18 than the holes 16, and are offset from the holes 16. Mounting holes 17, at each end of the member 2, are used to mount a cover plate (not shown) over the top portion of the delay line, and for supporting the delay line by means of suitable connectors inserted through the holes. The cover plate also functions to rigidly position the components mounted on the top of the member. A second covering plate may be similarly mounted over the components beneath the member to rigidly maintain them in position. The mounting holes 17 may be located at other suitable positions on the member 2.

The capacitors 22 of the delay line are arranged adjacent to each other beneath the base 5 of the mounting member 2. The capacitors 22 are in very close juxtaposition to each other in order to occupy a minimum amount of space. The leads 24 and 25 of the capacitors 22 extend through the holes 16 and 10 respectively and are bent angularly at the exit of the holes in order to support the capacitors in position (see Fig. 3), and function in place of separate terminal posts to receive the associated inductor leads. The holes 10 and 16 are chosen to be of such a diameter that the frictional contact of the leads with the inside surfaces of the holes also assists in supporting the capacitors in position during assembly. This is because the portion of the leads within the hole is often slightly bent.

The capacitors 22 are further maintained in position, with their upper edges 26 in surface-to-surface contact with the lower surface of base 5, by the solder portions 28 and 29 which are utilized primarily for electrical and mechanical connections. The ends of the leads 25 are preferably bent substantially normal to the edge 12, and alternately toward and away from edge 12 in order to provide mechanical support for connecting bus 31 before soldering. After soldering the leads may be clipped close to the solder joint. The solder portions together with the leads are of a larger cross section than the diameter of the holes and also function, in conjunction with the bus 31 connecting the bent ends of the leads 25 together, to prevent any forced withdrawal of the capacitors from the holes.

Where it may be necessary that certain sections of the delay line be tapped, the lead 24 (see Fig. 1) may be angularly bent to form a top 27 before insertion into hole 16. The tap 27 thus provides a convenient place to electrically and mechanically connect a lead to the delay line.

The capacitors need not be mounted directly beneath the associated holes but may be mounted a short distance therefrom since the leads can be bent into an appropriate angular shape 33 in order to fit them into the holes. This is particularly true in regard to the capacitors at the end of the member and results in minimizing the requisite length of the mounting member.

This feature of the invention (the capacitor leads functioning to both support the capacitors and provide a terminal post for associated electrical connections) serves to significantly lower the cost of manufacture of delay lines of the lumped parameter type by reducing the amount of labor and material required to mount and support the capacitors and the terminal posts.

Referring again to Figs. 1 and 2, the inductors 30 are arranged adjacent to each other between the legs 6 and 8 of the mounting member 2. The inductors, which will be described more fully below, are constructed using small cylindrical cores 32 of magnetic material having a diameter slightly smaller than the channel width of member 2. The cores 32 each have a circularly grooved portion at one end to receive a coil winding 34 (see Fig. 5). The cores 32 (known as pot cores) are stacked on a common axis to form an elongated cylindrical assembly (see Figs. 1 and 2) and are spaced from each other by spacer sheets 36. The spacer sheets 36 are preferably rectangular rather than circular with a side dimension equal to or slightly larger than the diameter of the pot cores. The rectangular shape allows for conveniently changing the sheets when required by grasping the corner extensions 37 outside the periphery of the cores with a suitable tool. The spacer sheets are preferably of mica but other magnetic or non-magnetic material is suitable. If the total space occupied by the capacitors 22 exceeds the space occupied by the inductors 30 and sheets 36, the former will determine the overall length of the member 2, and the unused space in the channel between legs 6 and 8 may be filled by filler spacers (not shown).

The pot cores 32 are arranged between the identical end retaining plates or pieces 38. The end plates 38 are rigidly mounted in the transverse slots 40 which are of equal depth and are cut into the legs 6 and 8 on lines parallel to the edges 45 at the ends of the member 2. The end plates are shaped to have short bottom extensions 44 having a width equal to the linear distance between the inside edges 14 and 18 of the legs 6 and 8. The extensions 44 have a length equal to the distance between the lower edges of the slots 40 and the upper surface of the base 5.

The end plates 38 are thus rigidly fixed in position at each end of the member 2. The end plates, of course, may also be shaped to fit into suitable grooves in the inside portions of the legs. The plates may be mounted in appropriate transverse slots or grooves at points intermediate the ends of the member to accompany a set of inductors which occupy only a portion of the length of the member.

The spring retainer plates 50, arranged between the legs 6 and 8 and adjacent to one end plate 38, are of a spread U-shape. The purpose of this U-shape is to permit the insertion of a suitable tool to compress the spring 56 between the retainer plates in order to insert or remove individual inductor assemblages or mica spacers. Each retainer plate has a rounded boss 54 in the center thereof which functions to retain the spring 56, mounted between the bosses 54, in position preventing lateral movement. A metal washer having grooved sides may also be used as a retainer plate. The compression device 49, comprising the combination of the spring retainer plates 50 and the spring 56, is mounted in series with the pot cores 32 and spacers 36. A suitable rubber washer in place of the spring and retainer plates may also be used to maintain the inductors in position. Similarly, the end plates 38 may also function as spring retainer plates utilizing a hollowed out portion to receive the spring 56.

Thus, all the components between the legs of the mounting member are held in position by the force exerted due to the compression of the spring. This method of construction allows for the replacement of individual pot cores and associated windings in case this becomes necessary during manufacture, testing, or actual use, without disturbing the associated inductors. (This would not be the case if a common tie rod were inserted through holes drilled in the center of the cores and tightened against appropriate end pieces fixed against shoulders on the mounting member to mount the cores.) Additionally, the delay line constants may be easily adjusted by varying the spacing between inductors as will be explained more fully below. Further, the spring maintains the spacing constant after adjustment irrespective of unequal coefficient of expansion of the different parts of the delay line.

In the construction of delay lines of the lumped parameter type it is frequently necessary to provide tie points for other leads of the inductors which are not connected directly to the capacitors. A feature of this invention which fulfills this requirement is shown in Fig. 4.

The tie point 60 is constructed by simply bending a piece of wire into a hairpin like element, that is doubling it back on itself, and inserting the bent wire open end first into the hole 20 through the entrance of the hole at the base 5. The open end 61 of the tie point is then spread to fix the tie point in position. The relationship of the cross section of the doubled wire portion and the diameter of the hole may be chosen such that bent portions intermediate the ends of the tie point will be in frictional engagement with the inside surface of the hole when inserted (see Fig. 1).

Figure 4:
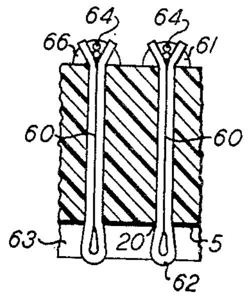
Fig. 4 is a sectional view of Fig. 3 along the lines 4—4 showing another feature of the invention.

As can be seen in Figs. 3 and 4, the loop or bent end 62 of the tie point 60 acts as a retaining head since the cross sectional area of the wire at this point is greater than the cross sectional area of the hole. The loop ends 62 are arranged in the slot 63 cut in the underside of the base 5 in line with the holes 20. The slot 63 is cut to have a width substantially equal to the diameter of the wire used to form the tie point and functions to maintain each loop 62 in the same position with respect to the slot, that is, with the two sections of wire comprising the tie point in line with the slot 63. This maintains the forked end 61 in position to receive the leads 64 of the inductors and prevents rotation of the tie point.

The loop 62 may also function as a terminal for other leads.

The leads 64 are inserted between the legs of the forked end 61 and are frictionally maintained in position between the sections of wire until soldering, without the necessity of twisting the inductor leads around the tie point. After soldering the free ends of the leads may be clipped at the solder joint. The solder portion 66 at the forked end 61 provides for electrically and mechanically connecting the lead 64 to the tie point. The solder portions 66 also operate to prevent the forced withdrawal of the tie points.

Thus, the tie point 60 is rigidly fixed in position by the loop end of the tie point at the entrance to the hole 20, and the wire fork and the solder portion at the other end. The tie point cannot turn in its hole since the bent head is fixed in the slot 63.

This aspect of the invention greatly simplifies the construction of the delay line with concomitant savings in labor, because of the simplicity of mounting of the tie point and the ease in supporting the leads of the inductor preparatory to soldering. Additionally, the cost of the wire comprising the tie point is negligible resulting in a further reduction in the cost of manufacture.

Figure 5:
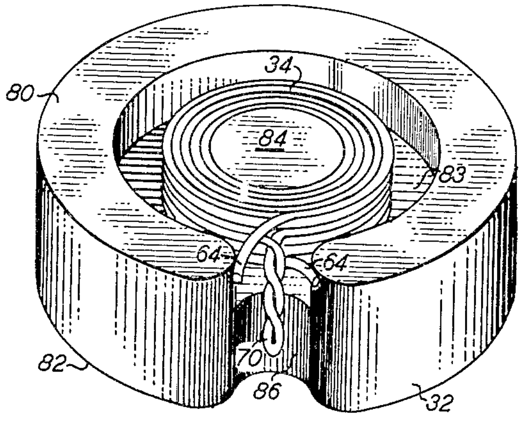
Fig. 5 is a perspective view of one part of a delay line section showing the inductor construction in accordance with the invention.

Referring to Fig. 5, the pot core and coil winding assemblage comprising inductor 30 is shown. The cylindrical core 32, made from a material having a high permeability and preferably of a low electrical conductance (a ferrite for example), has a circularly grooved face 80 and a plane face 82. The coil winding 34 is cemented in position completely within the groove 83 of the pot core 32.

This mounting method minimizes accidental breakage of the coil during construction of the delay line since the winding is fully protected within the groove.

The tap 70, which is connected to a turn of the coil winding and to which the capacitor 22 is connected, may be conveniently produced by twisting a portion of the wire of the coil winding to a suitable lead length at the appropriate time and position during winding of the coil. The end leads 64 of the winding are arranged near the tap 70 and the coil is mounted with the three leads extending through the opening 86 in one sector of the pot core 32.

Figures 6, 7:
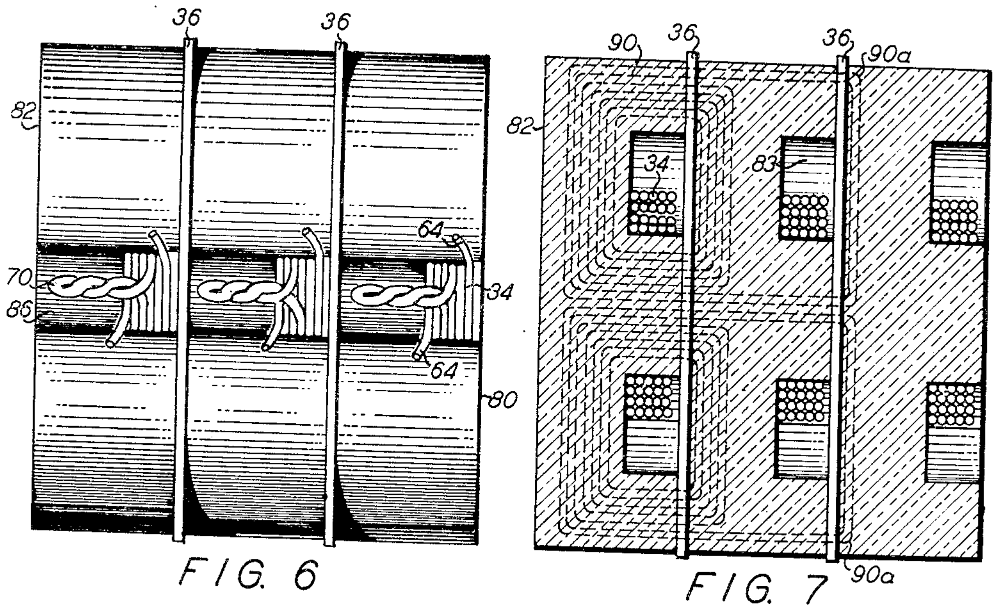
Fig. 6 is an elevational view of the inductor assemblage of two sections of the delay line embodying the invention.
Fig. 7 is a cross sectional view of Fig. 6 along the vertical diameter of the inductor assemblage.

The inductors 30 are cylindrically arranged adjacent to each other with the grooved face of one core next to the plane face of the next succeeding core (see Fig. 6). The spacer 36, may be made of any suitable non-magnetic material preferably electrically non-conducting, for example, mica. The spacers 36, which are mounted between the cores 32, are preferably of a square shape with each side approximately equal to the diameter of the pot cores. If necessary, the spacers may be made slightly larger than this in order to aid in eliminating variations in spacing of the cores due to burrs at the edges of the spacers. Undesirable variations in spacing would result if spacers having burred edges were circular of a diameter equal to or smaller than the diameter of the pot cores.

Figure 8:
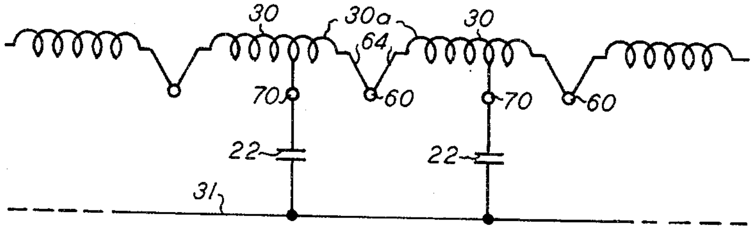
Fig. 8 illustrates the electrical equivalent of a portion of the delay line shown in Figs. 1 and 2.

The equivalent of an electrical section of the delay line 1 is shown in Fig. 8 where corresponding electrical parts of the delay line are designated by the same reference characters as are utilized in the description of the mechanical construction above.

The inductors 30 are in series connection, and the capacitors 22 are connected from the taps 70 on the inductors to the common connection 31. With this arrangement an electrical section of the delay line includes inductance 30*a* comprising segments of two adjoining inductors between the taps 70, and half of the capacitance of the capacitors connected to said taps. Therefore, in an electrical sense, the inductance 30*a* of one section of the line is made up of contributions of inductance from the adjacent inductors. Each capacitor contributes half of its capacitance to each of the adjoining sections. The end capacitors are chosen to have substantially half the capacity of the intermediate capacitors. Actual calculation indicates that for the usual assumptions the end capacity should be about 0.47 times the capacity of the intermediate capacitors for best results. The end leads 64 of the adjacent inductors are connected together at the tie point 60.

Summarizing, the inductor 30, which comprises a complete tapped winding in a single pot core, contributes a portion of the inductance to two sections of the delay line. Therefore, mutual inductance exists between the adjacent sections of an amount determined by the position of the tap, since the tap position will determine the ratio of turns between adjacent sections. For example, if the tap is close to one end of the winding, the mutual inductance will be small, but if the tap is near the center of the winding, the mutual inductance will be large.

In order to accurately control the amount of mutual inductance between inductances 30*a*, it is necessary to minimize coupling between coil windings due to common flux linkages. To achieve this, the delay line is preferably assembled from two types of coil windings placed alternately in the cylindrical stack. They are identical in respect to the number of turns, size of wire and location of taps, but the coil windings are mounted so that the directions of adjacent windings are opposite; that is, if a winding is wound in a clockwise direction, the adjacent windings are wound in a counterclockwise direction.

In this way the external fields of a set of inductors have been found to almost cancel each other, and the mutual inductance between sections of the line is almost entirely due to the effect of the tapped coil arrangement.

Thus the invention provides an inductor assemblage for delay lines which allows for a maximum amount of inductance per section through the use of magnetic cores while providing the optimum mutual inductance between adjacent sections.

Close control over the inductance of each section is necessary in order to design and manufacture delay lines to particular specifications. Due to variation in the construction of the coil windings and the pot cores, and to the lack of complete uniformity of the magnetic properties of the core material, it is somewhat difficult to accurately predict the inductance of each core and coil winding combination. The invention provides a very convenient and simple way to adjust for any small variation in the requisite inductances.

Referring to Fig. 7, which illustrates a cross section of the three adjacent inductor assemblages of Fig. 6, the magnetic circuit of each inductor 30 comprises the continuous path 90 perpendicular to the turns of and around a cross section of the coil winding and through the two adjacent cores. That is, the back of the next succeeding core provides a portion of the flux path.

Since the core material has a relatively high permeability, the major part of the reluctance in the flux path is in the gap between the cores occupied by the non-magnetic spacer 36. If the air gap is relatively small (for example, five thousandths of an inch), a small change in the gap will substantially affect the inductance.

After the delay line is assembled the inductance is easily adjusted by varying the gap between cores by the simple expedient of inserting spacers of varying thickness between the inductors while the spring 56 is further compressed (see Fig. 2). Thus minor differences in inductance may be compensated for, and uniformity of inductance may be obtained.

If replacement of an inductor 30 is required, during manufacture or adjustment, the spring 56 is similarly compressed to allow easy accessibility. Since the coil windings, which may be of very fine and therefore fragile wire, are completely protected within the grooves of the pot cores, there is little danger of breakage by spacer replacement during adjustment of the delay line.

Another advantage of the invention is that the probability of electrical shorting to ground of the coil windings is minimized since the mounting member is chosen to have good electrical insulating properties, and if, as is preferable, the spacers are also made of insulating material, the cores are insulated from each other.

Figure 9:
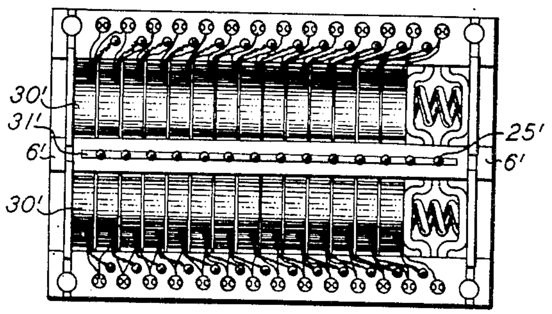
Fig. 9 is a plan or top view of another embodiment of the present invention.

Another embodiment of the present invention is shown in a top view of delay line 1' of Fig. 9 wherein corresponding parts of the delay line 1' are designated by the same reference numerals as in delay line 1, but with prime designations added.

Delay line 1' is substantially the same as delay line 1, the individual parts functioning in a similar manner, but includes two adjacent units, each similar to delay line 1, with a common center leg 6'. The leads 25' of each of the capacitors 22' are inserted through the holes (not shown) in the leg 6' and bent at the exit to provide support, with two leads to each hole. The hole diameter is chosen to provide a close frictional engagement of the wires with the inside surface of each hole to provide additional support for the capacitors. Each lead 25' may be bent around the bus 31' and soldered to said bus. This connection also functions to prevent the forced withdrawal of the leads from the holes.

This type of construction provides for multiplying the number of individual delay line units to increase the total delay, and at the same time minimizes the amount of space occupied by the units.

Figure 10:
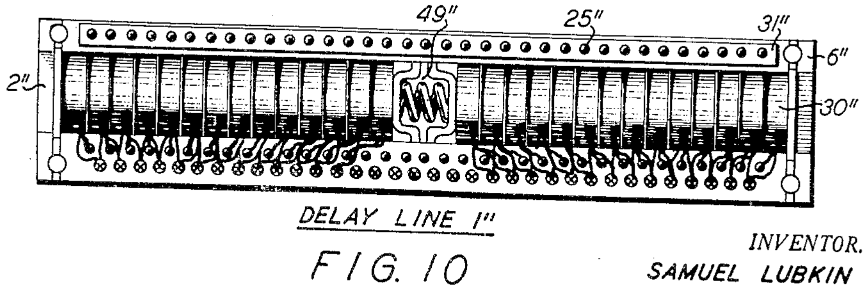
Fig. 10 is a plan or top view of a further embodiment of the present invention.

Another embodiment of the present invention is shown in Fig. 10 wherein corresponding parts of the delay line 1'' are designated by the same reference numerals as in delay line 1, but with double prime designations added.

Delay line 1'' is substantially the same as delay line 1 and the individual components function in the same manner. Delay line 1'' comprises two sequential units mounted on a common U-shaped mounting member 2'' with a common compression device 49'' intermediate the two delay line units. A perforated bus or strip 31'' (which is equivalent to the bus 31 of delay line 1) rests on the top surface of leg 6'' and receives the ends of the leads 25'', each of the leads being inserted through a hole and soldered to said strip. Alternately, the strip 31'' may be placed over all the extended leads prior to soldering and rested on the top surface of the leg 6''. The perforations in the strip are of a slightly larger diameter than the lead wire size. The strip 31'' functions the same way as connecting bus 31 of delay line 1, that is, it rigidly fixes the leads in position and prevents forced withdrawal of the capacitors. Delay lines 1'' may be mounted end to end preferably with single end plates between adjacent delay lines.

This type of construction thus provides for multiplying the number of individual delay line units to correspondingly increase the total delay, and at the same time minimizes the amount of space occupied by the delay line.

In the foregoing I have described my invention solely in connection with specific illustrative embodiments thereof. Since many variations and modifications of my invention will now be obvious to those skilled in the art, particularly combinations of the above embodiments, I prefer to be bound not by the specific disclosures herein contained but only by the appended claims.

What is claimed is:

1. An assemblage comprising a base member having a pair of holes extending therethrough, the surface bounding said holes being insulative, a component having two wire leads each of substantial length, the length of each of said holes being slightly less than the length of each of said wire leads, each of said wire leads extending through a corresponding hole and slidably and frictionally engaging a portion of the inside surface between the entrance and exit thereof providing support for said component, the portion of each of said leads extending from the exit of the associated hole having an altered shape for preventing withdrawal of said lead from said hole.

2. An assemblage comprising a base member having a pair of holes extending therethrough, the surface bounding said holes being insulative, a component having two wire leads each of substantial length, the length of each of said holes being slightly less than the length of each of said wire leads, each of said wire leads extending through a corresponding hole and slidably and frictionally engaging a portion of the inside surface between the entrance and exit thereof providing support for said component, and an electrical joint connecting the portion of each of said leads extending from the exit of the associated hole for providing an electrical connection to said component and for preventing withdrawal of said lead from said hole.

3. An assemblage comprising a base member having a pair of holes extending therethrough, the surface bounding said holes being insulative, a component having two wire leads each of substantial length, the length of each of said holes being slightly less than the length of each of said wire leads, each of said wire leads extending through a corresponding hole and slidably and frictionally engaging a portion of the inside surface between the entrance and exit thereof providing support for said component, and a solder joint connected to the portion of each of said leads extending from the exit of the associated hole for providing an electrical connection to said component and for preventing withdrawal of said lead from said hole.

4. An assemblage comprising a base member having a hole extending therethrough, the surface bounding said hole being insulative, a component having a wire lead of substantial length, the length of said hole being slightly less than the length of said wire lead, said wire lead extending through said hole and slidably and frictionally engaging the inside surface between the entrance and exit thereof providing support for said component, the portion of said lead extending from the exit of said hole having an altered shape for preventing withdrawal of said lead from said hole.

5. An assemblage comprising a base member having a hole extending therethrough, the surface bounding said hole being insulative, a component having a wire lead of substantial length, the length of said hole being slightly less than the length of said wire lead, said wire lead extending through a corresponding hole and slidably and frictionally engaging a portion of the inside surface between the entrance and exit thereof providing support for said component, and an electrical solder joint connected to the portion of said lead extending from the exit of said hole providing an electrical connection to said component and preventing withdrawal of said lead from said hole.

6. An assemblage comprising a mounting member having a hole of substantial length extending therethrough, the surface bounding said hole being insulative, a wire tie point, said wire tie point being mounted in and extending from said hole in said member and slidably and frictionally engaging a portion of the inside surface of said hole between the entrance and exit thereof providing support for said tie point, and an electrical joint connected to the extension of said tie point from said hole providing an electrical connection and preventing the withdrawal of said tie point from said hole.

7. The assemblage of claim 6 wherein said wire tie point comprises a piece of wire bent back on itself.

8. The assemblage of claim 6 wherein said wire tie point comprises a piece of wire bent back on itself to form a loop at one end, and an electrical joint connected to said loop.

9. An assemblage comprising a mounting member having a hole of substantial length extending therethrough, the surface bounding said hole being insulative, a wire tie point, said wire tie point being mounted in and extending from said hole in said member and slidably and frictionally engaging a portion of the inside surface of said hole between the entrance and exit thereof providing support for said tie point, and an electrical solder joint connected to the extension of said tie point from said hole providing an electrical connection and preventing the withdrawal of said tie point from said hole.

10. An assemblage comprising a mounting member having a hole of substantial length extending therethrough and in line with a slot in said mounting member, the surface bounding said hole being insulative, a tie point having a loop at one end, said tie point being mounted in and extending from said hole in said member and frictionally engaging a portion of the inside surface of said hole between the entrance and exit thereof providing support for said tie point, said loop being positioned in said slot for preventing rotation of said tie point and an electrical joint connected to the extension of said tie point from said hole providing electrical connections and preventing the withdrawal of said tie point from said hole.

11. An assemblage comprising a mounting member having a hole of substantial length extending therethrough and in line with a slot in said mounting member, the surface bounding said hole being insulative, a tie point having a loop at one end, said tie point being mounted in and extending from said hole in said member and slidably and frictionally engaging a portion of the inside surface of said hole between the entrance and exit thereof providing support for said tie point, said loop being positioned in said slot for preventing rotation of said tie point, and electrical joints connected to said loop and to the extension of said tie point from said hole for providing electrical connections and preventing the withdrawal of said tie point from said hole.

12. An assemblage comprising a mounting member having a hole of substantial length extending therethrough, the surface bounding said hole being insulative, a tie point comprising a piece of wire bent back on itself to form a loop at one end, said tie point being mounted in and extending from said hole in said member and frictionally engaging a portion of the inside surface of said hole between the entrance and exit thereof providing support for said tie point, said loop providing a hole for engaging a wire lead at the entrance of said hole, the two-ended portion of said tie point being forked at the exit of said hole for engaging a wire lead, and electrical joints connected to said loop and to the extension of said tie point from said hole providing electrical connections to said wire leads and preventing the withdrawal of said tie point from said hole.

13. The assemblage of claim 12 wherein said electrical joints are solder connections.

14. An assemblage comprising a mounting member having a hole of substantial length extending therethrough in line with a slot, the surface bounding said hole being insulative, a tie point comprising a piece of wire bent back on itself to form a loop at one end, said tie point being mounted in and extending from said hole in said member and frictionally engaging a portion of the inside surface of said hole between the entrance and exit thereof providing support for said tie point, said loop being positioned in said hole to prevent rotation of said tie point, said loop providing a hole for engaging a wire lead at the entrance of said hole, the two-ended portion of said tie point being forked at the exit of said hole for engaging a wire lead and electrical solder joints connected to said loop and to the extension of said tie point from said hole providing electrical connections to said wire leads and preventing the withdrawal of said tie point from said hole.

15. An assemblage comprising a base member having a pair of holes extending therethrough, the surface bounding said holes being insulative, a component having a wire of substantial length, the length of one of said holes being slightly less than the length of said wire, said wire extending through said one of said holes and slidably and frictionally engaging a portion of the inside surface between the entrance and exit thereof providing support for said component, a wire tie point mounted in and extending from said other hole and slidably and frictionally engaging a portion of the inside surface between the entrance and exit thereof providing support for said wire tie point, and an electrical joint connected to the portion of each of said wires extending from the exit of the associated hole for providing an electrical connection between said wires and for preventing the withdrawal of said wires from said holes.

16. An assemblage comprising a base member having a pair of holes extending therethrough, the surface bounding said holes being insulative, a component having a wire of substantial length, the length of one of said holes being slightly less than the length of said wire, said wire extending through said one of said holes and slidably and frictionally engaging a portion of the inside surface between the entrance and exit thereof providing support for said component, a piece of wire doubled back to contact itself, said doubled-back piece of wire extending through said other hole and slidably and frictionally engaging a portion of the inside surface between the entrance and exit thereof providing support for said piece of wire, and an electrical joint connected to the portion of each of said wires extending from the exit of the associated hole for providing an electrical connection between said wires and for preventing the withdrawal of said wires from said holes.

17. An assemblage comprising a base member having first and second holes extending therethrough, said second hole being in line with a slot in said base member, the surface bounding said holes being insulative, a component having a wire of substantial length, the length of said first hole being slightly less than the length of said wire, said wire extending through said first hole and slidably and frictionally engaging a portion of the inside surface between the entrance and exit thereof providing support for said component, a piece of wire doubled back to contact itself to form a loop at one end, said doubled-back piece of wire extending through said second hole and slidably and frictionally engaging a portion of the inside surface between the entrance and exit thereof providing support for said piece of wire, said loop being positioned in said slot preventing rotation thereof, and an electrical solder joint connected to the portion of each of said wires extending from the exit of the associated hole for providing an electrical connection between said wires and for preventing the withdrawal of said wires from said holes.

References Cited in the file of this patent

UNITED STATES PATENTS

| | | |
|---|---|---|
| 1,918,078 | Apple | July 11, 1933 |
| 1,993,494 | Weiscapf | Mar. 5, 1935 |
| 2,244,009 | Hiensch | June 3, 1941 |
| 2,270,166 | Hiensch | Jan. 13, 1942 |
| 2,390,563 | Tawney | Dec. 11, 1945 |
| 2,533,483 | Losquadro | Dec. 12, 1950 |
| 2,568,486 | Cage | Sept. 18, 1951 |
| 2,569,036 | Benner | Sept. 25, 1951 |
| 2,631,184 | Sampson | Mar. 10, 1953 |

FOREIGN PATENTS

| | | |
|---|---|---|
| 646,975 | Great Britain | Nov. 29, 1950 |
| 649,254 | Great Britain | Jan. 24, 1951 |
| 671,156 | France | Dec. 10, 1929 |
| 926,456 | France | Oct. 2, 1947 |